United States Patent
Davison

(10) Patent No.: US 7,567,181 B1
(45) Date of Patent: Jul. 28, 2009

(54) CHILD CUSHION MONITOR APPARATUS

(76) Inventor: Zenobia F. Davison, 6424 Valleybrook Ct., Arlington, TX (US) 76001

( * ) Notice: Subject to any disclaimer, the term of this patent is extended or adjusted under 35 U.S.C. 154(b) by 271 days.

(21) Appl. No.: 11/750,800

(22) Filed: May 18, 2007

(51) Int. Cl.
- *B60Q 1/00* (2006.01)
- *G08B 23/00* (2006.01)
- *G08B 21/00* (2006.01)
- *G08B 1/08* (2006.01)

(52) U.S. Cl. .................. 340/573.1; 340/457; 340/665; 340/666; 340/667; 340/668; 340/539.1

(58) Field of Classification Search .................. 340/457, 340/573.1, 573.4, 665–668, 539.1
See application file for complete search history.

(56) References Cited

U.S. PATENT DOCUMENTS

| | | | |
|---|---|---|---|
| 5,581,234 A | 12/1996 | Emrey et al. | |
| 5,949,340 A | 9/1999 | Rossi | |
| 5,966,070 A * | 10/1999 | Thornton | 340/425.5 |
| 6,104,293 A * | 8/2000 | Rossi | 340/573.1 |
| 6,812,844 B1 * | 11/2004 | Burgess | 340/573.1 |
| 6,847,302 B2 * | 1/2005 | Flanagan et al. | 340/666 |
| 6,922,147 B1 * | 7/2005 | Viksnins et al. | 340/573.1 |
| 7,012,533 B2 * | 3/2006 | Younse | 340/573.1 |
| 7,218,218 B1 * | 5/2007 | Rogers | 340/522 |
| 7,339,463 B2 * | 3/2008 | Donaldson | 340/457 |
| 7,378,974 B1 * | 5/2008 | Bassett et al. | 340/573.1 |
| 7,385,520 B2 * | 6/2008 | Patterson et al. | 340/667 |
| 7,463,161 B2 * | 12/2008 | Griffin et al. | 340/667 |
| 7,478,875 B2 * | 1/2009 | Patterson et al. | 297/217.3 |

* cited by examiner

*Primary Examiner*—Benjamin C Lee
*Assistant Examiner*—Lam P Pham
(74) *Attorney, Agent, or Firm*—Crossley Patent Law; Mark A. Crossley

(57) ABSTRACT

A child cushion monitor apparatus provided in two embodiments, a seat insert and a pillow, each providing for detection of occupancy. Each embodiment further provides for temperature sensing and display. Each embodiment is also flexibly coupled to a vibration sensor to detect vibration of a nearby device, auto or otherwise. The keychain provides for function and remote monitoring of the embodiments of the apparatus. Both the seat insert and pillow provide visual display of operable functions of the apparatus.

16 Claims, 3 Drawing Sheets

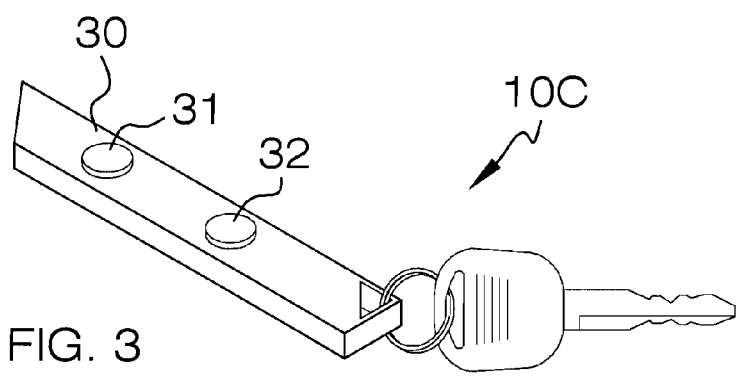
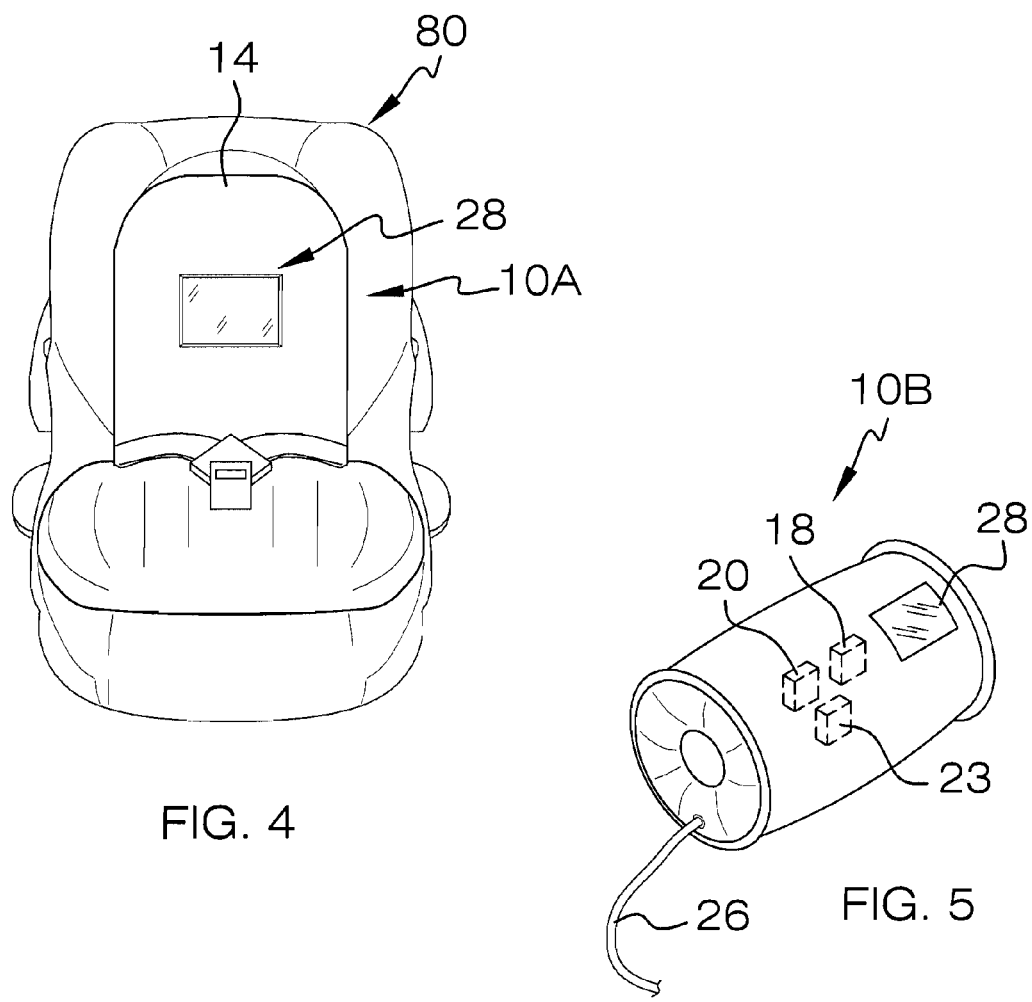

CHILD CUSHION MONITOR APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Tragic deaths have occurred from children being left unattended, especially in automobiles. High heat conditions are especially dangerous. Children left alone are also subject to harm in other ways. Monitoring a child to ensure a child's safety needs to be addressed. A monitoring device is needed which can monitor a child in a seat even when the caregiver is aware of the child's location, but cannot visually or physically monitor the child continuously. A monitoring apparatus is needed which can be used in virtually any seat a child might sit in, or where a child might lie down with a pillow. Numerous child seats are already in use which do not provide for unattended child warning. A monitor for fitting such seats would enable monitoring without the expense of seat replacement. For children not sitting, an appropriate monitor is needed. The apparatus should also use more than one monitoring medium, as any single type of medium might be prone to failure, and as a single monitor medium cannot detect all areas of concern. For example, sole use of a weight sensor does not ensure detection of dangerously high temperatures to which a child might be subjected. A valuable addition to an ideal monitor provides for instant visual verification that a monitor is functional. The present child cushion monitor apparatus fulfills the above-listed needs.

FIELD OF THE INVENTION

The child cushion monitor apparatus relates to systems for detecting underage seat occupants and, more specifically, to a child cushion monitor apparatus with more than one monitoring medium, which warns a caregiver of an unattended child and of possibly dangerous conditions.

DESCRIPTION OF THE PRIOR ART

A majority of prior art comprises child seats in entirety. For example, U.S. Pat. No. 5,581,234 issued to Emery et al. on 1996 Dec. 3 teaches an infant vehicle seat warning seat alarm system that warns of the relation of seat to base condition and of harness use. U.S. Pat. No. 5,949,340 issued to Rossi on 1999 Sep. 7 teaches a warning system for detecting presence of a child in an infant seat. U.S. Pat. No. 6,847,302 issued to Flanagan et al. on 2005 Jan. 25 teaches an object proximity monitoring and alarm system which alarms a keychain of child seat occupancy, when the keychain becomes distant from the seat. The device cannot detect temperature, nor provide visual confirmation that the device is functional as does the present apparatus.

SUMMARY OF THE INVENTION

The general purpose of the child cushion monitor apparatus, described subsequently in greater detail warning, is to provide a child cushion monitor apparatus which has many novel features that result in an improved child cushion monitor apparatus which is not anticipated, rendered obvious, suggested, or even implied by prior art, either alone or in combination thereof.

To attain this, the present fully portable apparatus insert is provided upon which a child can sit, whether within a designated child seat or other seat, in one embodiment of the apparatus. The second embodiment of the apparatus provides a pillow with identical functions. The apparatus monitors a child's presence under specific parameters. Both embodiments are self-energized with batteries and therefore independent of externally supplied power. Both embodiments operate in concert with the keychain of the apparatus.

The seat insert embodiment is thin enough to fit within child seats and to fit unobtrusively upon various seating surfaces. The insert provides airwave communication between the keychain and the insert. Each embodiment has a portable flexibly connected means of detecting whether or not an accompanying vibration generating device is operational. The vibration-generating device may be an auto, a radio, a television, or other device in proximity to the apparatus. In addition, the apparatus provides visual check of systems' operable functions, in order that a child care provider is assured of apparatus operation.

The seat insert embodiment of the apparatus is for use in a seat, whether portable or permanently disposed. The seat back and seat bottom of the seat insert apparatus are joined by an articulation that allows for the insert to bend at most angles needed to fit an existing seat. The insert is made in more than one thickness, but thickness ranges from only 1 to 2 inches so that the insert is not cumbersome in fitting most seats. The relatively thin insert therefore positions electronic components in the seat back, so that the components do not impose on seat insert comfort, thereby enabling the thin profile of the insert. The vibration sensor is provided for attachment to an auto or other vibration generating device. An ideal location for the vibration sensor in an auto is some metallic portion of the body, or proximal to the body portion, so that engine operation vibrations are transmitted to the vibration sensor. The vibration sensor detects whether or not the engine is running. The seat back is equipped with a calibrated pressure sensor. As the pressure sensor is in the seat back, weight sensing is a calibrated factor designed to register a fraction of occupant weight via pressure sensitivity setting of the pressure sensor. As example, a 20 pound child exerts only a small portion of that weight rearward, to the seat back. As a further example, only a fraction of body weight is supported by a pillow. The pressure sensor is calibrated to detect that fraction of overall weight in computing occupancy. The seat back is optionally fitted with the display 28. The display, when functional, constantly displays temperature. Further, the display contains a small label light which glows in indication of pressure sensor function. A third labeled light glows in indication of vibration sensor function. Low battery condition fails to light the display. The display thereby provides instant visual check of systems prior to placement of a child in the seat insert or upon the pillow. The pillow embodiment of the apparatus provides the same functions and optional functions as does the seat insert embodiment.

Thus has been broadly outlined the more important features of the child cushion monitor apparatus so that the detailed description thereof that follows may be better understood and in order that the present contribution to the art may be better appreciated.

Numerous objects, features and advantages of the child cushion monitor apparatus will be readily apparent to those of ordinary skill in the art upon reading the following detailed description of presently preferred, but nonetheless illustrative, examples of the child cushion monitor apparatus when taken in conjunction with the accompanying drawings. In this respect, before explaining the current examples of the child cushion monitor apparatus in detail, it is to be understood that the child cushion monitor apparatus is not limited in its application to the details of construction and arrangements of the components set forth in the following description or illustration. The apparatus is capable of other examples and of being practiced and carried out in various ways.

It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the child cushion monitor apparatus. It is therefore important that the claims be regarded as including such equivalent constructions insofar as they do not depart from the spirit and scope of the present apparatus.

An object of the child cushion monitor apparatus is to provide child security and safety.

A further object of the child cushion monitor apparatus is to provide for fully portable use.

Another object of the child cushion monitor apparatus is to fit existing child seats, as well as other seats and surfaces.

And, an object of the child cushion monitor apparatus is to provide monitoring of the mediums of surface occupation, temperature, and proximity.

An added object of the child cushion monitor apparatus is to provide for monitoring an accompanying "on" condition of a vibration generating device.

Other objects of the child cushion monitor apparatus, along with various novel features that characterize the apparatus are particularly pointed out in the claims forming a part of this disclosure. For better understanding of the child cushion monitor apparatus, its operating advantages and specific objects attained by its uses, refer to the accompanying drawings and description.

BRIEF DESCRIPTION OF THE DRAWINGS

FIG. 3 is a perspective view of the keychain of the apparatus.

FIG. 4 front elevation view of the seat insert embodiment fitted to a seat.

FIG. 5 is a perspective view of the pillow embodiment of the apparatus.

DETAILED DESCRIPTION OF THE DRAWINGS

Figure 1:
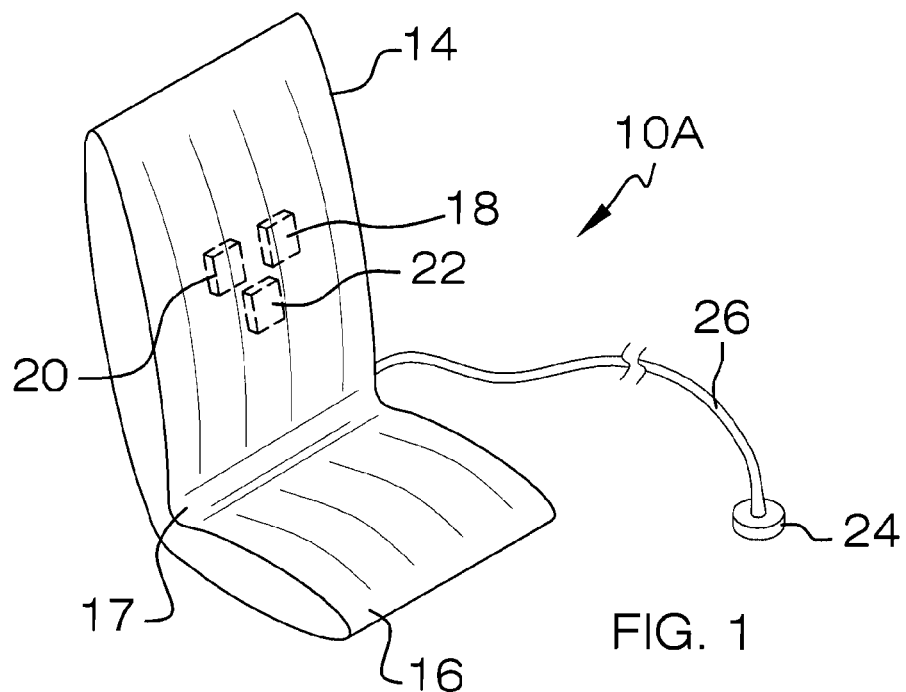
FIG. 1 is a perspective view of the seat insert embodiment.
Figure 2:
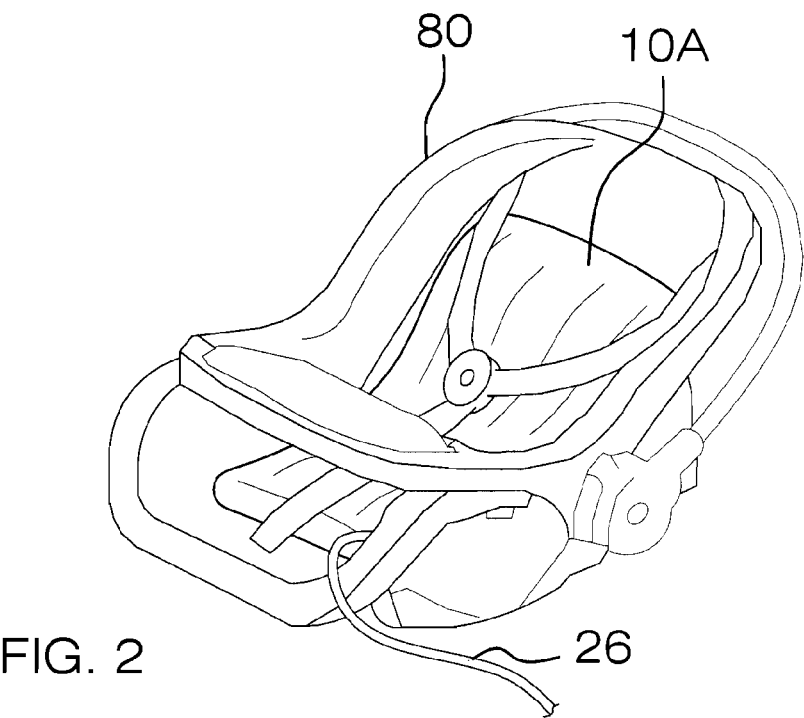
FIG. 2 is a perspective view of the seat insert embodiment fitted within a child seat.

With reference now to the drawings, and in particular FIGS. 1 through 6 thereof, example of the child cushion monitor apparatus employing the principles and concepts of the present apparatus and generally designated by the reference numbers 10A, 10B, and 10C will be described.

Referring to FIGS. 1, 2, 4, and 6, the portable child monitor apparatus 10A and 10C comprises a seat insert 10A for use in an existing seat 80. The insert 10A comprises a seat back 14 and a seat bottom 16. The articulation 17 connects the seat back 14 to the seat bottom 16. The insert CPU 22 (computer processing unit) is disposed within the seat back 14. A transmitter (not shown) is coupled with the insert CPU 22. A replaceable battery power (not shown) is provided for the insert CPU 22. The temperature sensor 20 is disposed within the seat back 14. The temperature sensor 20 is in communication with the insert CPU 22. The calibrated pressure sensor 18 is disposed within the seat back 14. The pressure sensor 18 is in communication with the insert CPU 22. The remotely locatable magnetic vibration sensor 24 is provided with flexible connection 26 for communication with the insert CPU 22. The display screen 28 is disposed within the seat back 14. The display screen 28 is in communication with the insert CPU 22.

Figure 6:
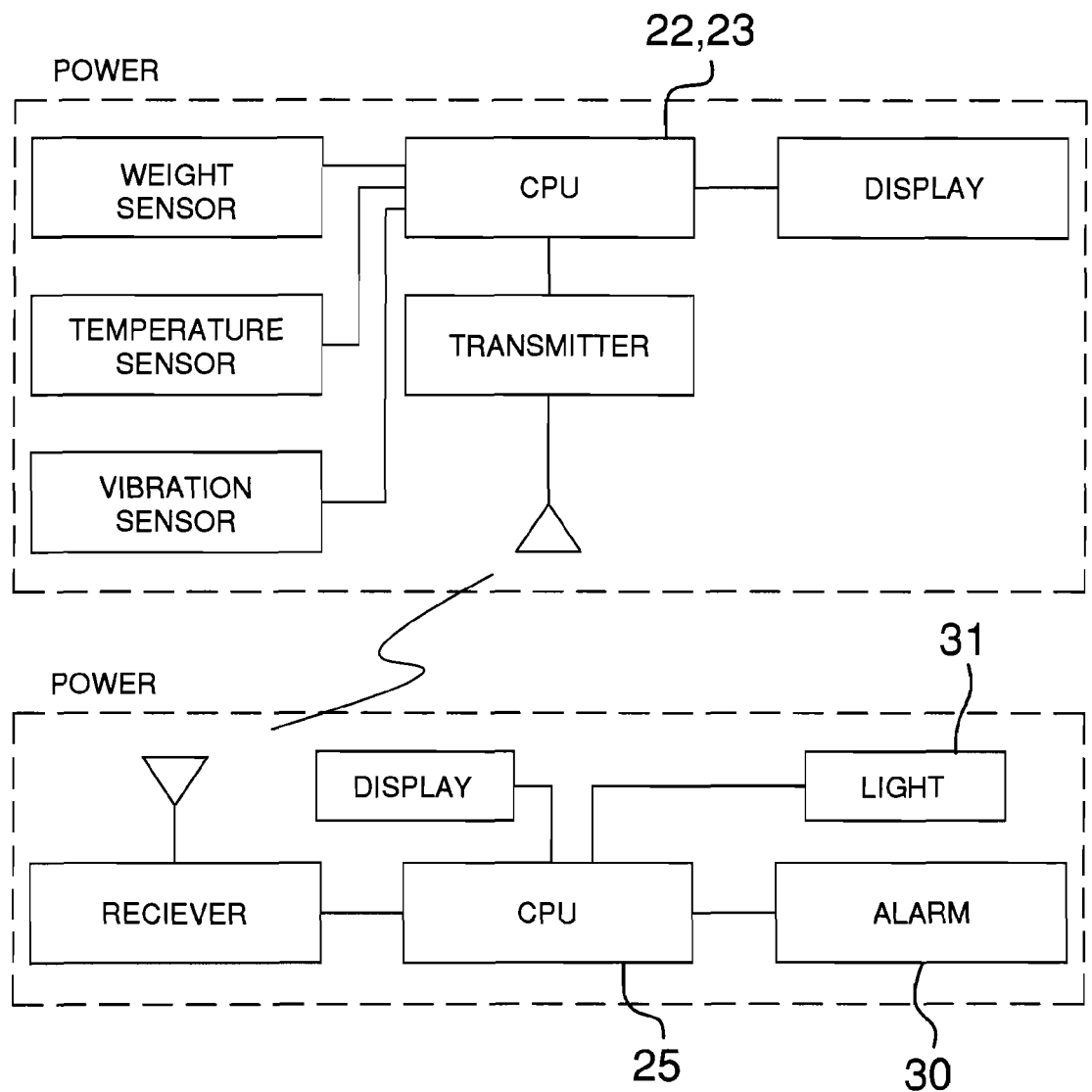
FIG. 6 is schematic block diagram of the electronic components of the apparatus.

Referring to FIGS. 3 and 6, the keychain 10C is provided in combination with the insert 10A. The keychain 10C is in airwave communication with the insert CPU 22. The keychain 10C comprises a keychain CPU 25. The arming button 32 of the keychain 10C arms the insert 10A and the keychain 10C. The alarm 30 is disposed on the keychain 10C and is in communication with the keychain CPU 25. The light 31 is provided in combination with the alarm 30. The light 31 glows in the condition of pressure sensed by the pressure sensor 18. The light 31 flashes with pressure sensed by the pressure sensor 18 and a concomitant absence of vibration sensed by the vibration sensor 24 for thirty seconds. The vibration sensor 24 thereby senses an auto engine cessation or the cessation of other vibrating devices to which the vibration sensor 24 may be attached. The proximity sensor (not shown) is a part of and in communication with the keychain CPU 25. The alarm 30 is sounded with a predetermined temperature sensed by the temperature sensor 20 of the insert 10A. The preferred temperature sensing is set at 95 degrees Fahrenheit. The keychain 10C light 31 flashes and the keychain 10C alarm 30 sounds when the keychain 10C reaches a predetermined proximity boundary in relation to the seat 10A. That boundary dimension can be adjusted by an adjusting screw (not shown) on the exterior of the keychain 10C. The boundary dimension is adjustable from 10 feet to 50 feet.

Referring to FIG. 5, the second embodiment is provided as the pillow 10B. Like the insert 10A, the pillow 10B works in concert with the keychain 10C. The pillow 10B is comprised of a pillow CPU 23 disposed within the pillow 10B. The transmitter (not shown) is coupled with the pillow CPU 23 as is battery power (not shown). The temperature sensor 20 is disposed within the pillow 10B. The temperature sensor 20 is in communication with the pillow CPU 23. The calibrated pressure sensor 18 is disposed within the pillow 10B. The pressure sensor 18 is in communication with the pillow 23. The pressure sensor 18 is calibrated to measure occupancy of the pillow 10B at a fraction of body weight, therefore not requiring full body weight of a user to record presence. The remotely locatable magnetic vibration sensor 24 is in communication with the pillow CPU 23 via the flexible connection 26. The display screen 27 us disposed within the pillow 10B. The display screen 28 is in communication with the pillow CPU 23.

The keychain 10C is in airwave communication with the pillow CPU 23. The keychain 10C is described above and functions in concert with the pillow 10B exactly as the keychain 10C functions with the seat insert 10A.

The display screen 28 of both the insert 10A and the pillow 10B provides a monitor for all operable functions of the pillow 10B or the insert 10A and of the keychain 10C. The display screen 28 is in communication with the pillow 10B or the insert 10A, respectively. A single push of the arming button 32 arms the apparatus 10A, 10B, 10C. Upon arming, the display screen provides a 10 second display of operable functions of the pillow 10B or the insert 10A. An item title is displayed for each operable sensor, which includes pressure sensor 18, temperature sensor 20, and vibration sensor 24. Further, the keychain 10c alarm 30 sounds and the light 31 flashes. This provides a user with assurance that all functions of the apparatus 10A, 10B, and 10C are functional. Any non-functional components are not displayed, lit, or sounded, thereby notifying the user.

With respect to the above description then, it is to be realized that the optimum dimensional relationships for the parts of the child cushion monitor apparatus for an auto, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present apparatus.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present apparatus may be used.

Therefore, the foregoing is considered as illustrative only of the principles of the apparatus. Further, since numerous modifications and changes will readily occur to those skilled in the art, it is not desired to limit the child cushion monitor apparatus to the exact construction and operation shown and described, and accordingly, all suitable modifications and equivalents may be resorted to, falling within the scope of the child cushion monitor apparatus.

What is claimed is:

1. A portable child monitor apparatus with seat insert for use in a seat, comprising, in combination:
   a seat back of the insert;
   a seat bottom of the insert;
   an articulation connecting the seat back to the seat bottom;
   an insert CPU disposed within the seat back;
   a transmitter coupled with the insert CPU;
   battery power for the insert CPU;
   a temperature sensor disposed within the seat back, the temperature sensor in communication with the insert CPU;
   a calibrated pressure sensor disposed within the seat back, the pressure sensor is responsive to the presence of a child on the seat insert and in communication with the insert CPU;
   a remotely locatable magnetic vibration sensor proximate the vehicle engine in communication with the insert CPU for indicating running state of the vehicle engine;
   a display screen disposed within the seat back, the display screen in communication with the insert CPU;
   a keychain, the keychain in airwave communication with the insert CPU, the keychain comprising:
      a keychain CPU;
      an arming button for arming the insert and the keychain;
      a indicator light in communication with the keychain CPU, wherein,
         the light glows in response to the condition of pressure sensed by the pressure sensor;
         the light flashes with pressure sensed by the pressure sensor, and vibration absence sensed by the vibration sensor for thirty seconds;
      a proximity sensor for sensing the proximity of the seat insert in relation to the key chain and in communication with the keychain CPU;
      an audible alarm in communication with the keychain CPU, the alarm sounded with a predetermined temperature sensed by the temperature sensor of the insert, indicative of an unsafe condition for the child.

2. The apparatus in claim 1 wherein the keychain alarm and keychain light are combined.

3. The apparatus in claim 1 wherein the keychain light flashes and the keychain alarm sounds when the keychain reaches a predetermined proximity boundary in relation to the seat insert.

4. The apparatus in claim 2 wherein the keychain light flashes and the keychain alarm sounds when the keychain reaches a predetermined proximity boundary in relation to the seat insert.

5. The apparatus in claim 1, wherein,
   the display screen displays an on condition for all operable functions of the insert and the keychain, with the arming button on.

6. The apparatus in claim 2, wherein,
   the display screen displays an on condition for all operable functions of the insert and the keychain, with the arming button on.

7. The apparatus in claim 3, wherein,
   the display screen displays an on condition for all operable functions of the insert and the keychain, with the arming button on.

8. The apparatus in claim 4, wherein,
   the display screen displays an on condition for all operable functions of the insert and the keychain, with the arming button on.

9. A portable child monitor apparatus being used inside a vehicle, comprising, in combination:
   a pillow;
   a pillow CPU disposed within the pillow;
   a transmitter coupled with the pillow CPU;
   battery power for the pillow CPU;
   a temperature sensor disposed within the pillow, the temperature sensor in communication with the pillow CPU;
   a calibrated pressure sensor disposed within the pillow, the pressure sensor is responsive to the presence of a child applying a force onto the pillow and in communication with the pillow CPU;
   a remotely locatable magnetic vibration sensor proximate the vehicle engine in communication with the pillow CPU for indicating the running state of the vehicle engine;
   a display screen disposed within the pillow, the display screen in communication with the pillow CPU;
   a keychain, the keychain in airwave communication with the pillow CPU, the keychain comprising:

a keychain CPU;
an arming button for arming the keychain and the pillow;
a indicator light in communication with the keychain CPU;
  wherein,
    the light glows in response to the condition of pressure sensed by the pressure sensor;
    the light flashes with pressure sensed by the pressure sensor, and vibration absence sensed by the vibration sensor for thirty seconds;
a proximity sensor for sensing the proximity of the pillow in relation to the keychain and in communication with the keychain CPU;
an audible alarm in communication with the keychain CPU, the alarm sounded with a predetermined temperature sensed by the temperature sensor of the pillow, indicative of an unsafe condition for the child.

10. The apparatus in claim 9 wherein the keychain alarm and keychain light are combined.

11. The apparatus in claim 9 wherein the keychain light flashes and the keychain alarm sounds when the keychain reaches a predetermined proximity boundary in relation to the pillow.

12. The apparatus in claim 10 wherein the keychain light flashes and the keychain alarm sounds when the keychain reaches a predetermined proximity boundary in relation to the pillow.

13. The apparatus in claim 9, wherein,
  the display screen displays an on condition for all operable functions of the pillow and the keychain, with the arming button on.

14. The apparatus in claim 10, wherein,
  the display screen displays an on condition for all operable functions of the pillow and the keychain, with the arming button on.

15. The apparatus in claim 11, wherein,
  the display screen displays an on condition for all operable functions of the pillow and the keychain, with the arming button on.

16. The apparatus in claim 12, wherein,
  the display screen displays an on condition for all operable functions of the pillow and the keychain, with the arming button on.

* * * * *